United States Patent
Steeb et al.

(10) Patent No.: US 10,464,178 B1
(45) Date of Patent: Nov. 5, 2019

(54) METHOD AND ASSEMBLY FOR DOCKING AND RETRIEVING A FILAMENT HOLDING DEVICE

(71) Applicants: Samuel J. Steeb, Edgerton, KS (US); Eric Eugene Rolfe, Kansas City, MO (US)

(72) Inventors: Samuel J. Steeb, Edgerton, KS (US); Eric Eugene Rolfe, Kansas City, MO (US)

( * ) Notice: Subject to any disclaimer, the term of this patent is extended or adjusted under 35 U.S.C. 154(b) by 0 days.

(21) Appl. No.: 16/157,698

(22) Filed: Oct. 11, 2018

(51) Int. Cl.
*B23Q 3/155* (2006.01)
*B33Y 30/00* (2015.01)
*B33Y 40/00* (2015.01)
*B29C 64/00* (2017.01)
*B29C 64/30* (2017.01)

(52) U.S. Cl.
CPC .......... *B23Q 3/15566* (2013.01); *B29C 64/30* (2017.08); *B33Y 30/00* (2014.12); *B33Y 40/00* (2014.12); *B23Q 2003/15527* (2016.11); *Y10T 483/17* (2015.01); *Y10T 483/1809* (2015.01)

(58) Field of Classification Search
CPC .. B23Q 3/155; B23Q 3/15506; B23Q 3/1556; B23Q 3/15566; B23Q 2003/15527; B29C 64/00; B33Y 30/00; B33Y 40/00; B23K 26/342; Y10T 483/17; Y10T 483/1809
USPC .............................. 483/16, 59; 425/182, 375
See application file for complete search history.

(56) References Cited

U.S. PATENT DOCUMENTS

| | | | |
|---|---|---|---|
| 5,993,365 A * | 11/1999 | Stagnitto | B25J 15/0491 414/736 |
| 6,986,654 B2 * | 1/2006 | Imiolek | B22F 3/1055 425/182 |
| 7,625,198 B2 * | 12/2009 | Lipson | A61L 27/36 425/174 |
| 8,926,484 B1 * | 1/2015 | Comb | B23Q 3/155 425/162 |
| 9,358,728 B1 * | 6/2016 | Chang | B29C 31/04 |
| 9,427,838 B2 * | 8/2016 | Comb | B23Q 3/155 |
| 2014/0034214 A1 | 2/2014 | Boyer et al. | |
| 2014/0363532 A1 | 12/2014 | Wolfgram | |
| 2017/0190108 A1 | 7/2017 | Holland et al. | |
| 2017/0190109 A1 | 7/2017 | Holland | |

FOREIGN PATENT DOCUMENTS

CA 3013502 A1 * 8/2017 ............. B23Q 1/015

* cited by examiner

*Primary Examiner* — Sunil K Singh
*Assistant Examiner* — Michael Vitale
(74) *Attorney, Agent, or Firm* — Dale J. Ream

(57) ABSTRACT

A docking assembly for docking and retrieving a filament holding device includes a motor casing rod defining a recess, filament holders and docking stations. Each filament holder defines a filament receiver channel for receiving the rod and a stop member that is selectively engaged with the recess of the rod, thus coupling a filament holder to the rod for retrieval of the filament holder. Each docking station includes a deployment latch operable to rotate when the rod is inserted into the docking receiver channel so that the deployment latch urges the stop member to the deployed configuration for coupling together the rod and the filament holder. Thus, a filament holder is captured for removal from the docking station. The docking apparatus includes a release lever that operates in reverse of the deployment latch so as to release a filament holder from the rod back to its docking station.

10 Claims, 22 Drawing Sheets

METHOD AND ASSEMBLY FOR DOCKING AND RETRIEVING A FILAMENT HOLDING DEVICE

BACKGROUND OF THE INVENTION

This invention relates generally to printing devices and, more particularly, to a method and assembly for docking and retrieving a filament holding device from a printing device so that a printing process need not be stopped for manual replacement of a filament.

3D printers have become common for building structures one layer at a time by laying down very thin layers of resin according to a computer-generated design. Such rapid prototyping equipment allows for making tools and even full machines in environments where traditional manufacturing equipment is not available, such as in outer space, medical facilities, or the like. In addition, there are now many different types and formulations of material used for 3D printing, each having unique properties and characteristics. Some product designs require multiple types of material or perhaps just different colors before a completed product is finished. In the past, a 3D printer had to be suspended or interrupted until a filament having a first material was swapped out and replaced with another filament and the process restarted.

Various devices and methods have been implemented or proposed in the art for using more than a single filament of material to complete a 3D printer run. Although presumably effective for their intended purposes, the existing attempts at providing multiple filaments to complete a job suffer from various disadvantages. For instance, machines having a pair of filament cartridges which may be alternated result in overly heavy print heads on which the cartridges are mounted. Adding more alternative filament choices to a single 3D printer only exacerbates the problem of weight, sluggishness, and maintenance. Multiple nozzles associated with a print head may also result in alignment problems, a reduced print area, and complex electronics or software.

Therefore, it would be desirable to have retrieval and docking assembly in which multiple filaments share a common print head and which may be selectively retrieved singly for use by the print head and then docked to an associated docking station, another filament holder retrieved, and so on. Further, it would be desirable to have a retrieval and docking assembly that provides multiple docking stations so that respective filament holders may be retrieved therefrom or docked thereto, respectively, quickly and without adding mass to the print head itself. In addition, it would be desirable to have retrieval and docking assembly having a rotating deployment latch for causing the capture and retrieval of a filament holder and a rotating release lever for causing a release and docking of a previously retrieved filament holder. It is understood that the retrieval and docking assembly will be described according to an exemplary embodiment in the context of a 3D printer assembly.

SUMMARY OF THE INVENTION

A docking assembly and method for docking and retrieving a filament holding device from a printing device of a type having a printing head according to the present invention includes a motor casing rod associated with the printing head, the rod defining a recess proximate a distal end. The docking assembly includes one or a plurality of filament holders and docking stations. Each filament holder defines a filament receiver channel for receiving the motor casing rod. Each filament holder includes a stop member that is movable between a retracted position disengaged from the recess of the motor casing rod and a deployed configuration engaged with the recess of the motor casing rod when the motor casing rod is fully extended through the filament receiver channel. The stop member may also be referred to as a "catch" as its engagement with the motor casing rod effectively catches or captures a filament holder from its docking station.

Each docking station includes a docking wall defining a docking receiver channel that is collinear and in communication with the filament receiver channel for receiving the motor casing rod. A deployment latch is pivotally coupled to filament holder framework and has an arcuate configuration that includes first and second ends, the deployment latch being operable to rotate from an unrotated configuration to a rotated configuration when the motor casing rod is fully inserted into the docking receiver channel so that the second end of the deployment latch urges the stop member to the deployed configuration for coupling together the motor casing rod and the filament holder. Thus, a filament holder is captured and may be removed from the docking station, say, of a 3D printer. The docking apparatus includes a release lever that operates largely in reverse of the deployment latch so as to release a filament holder from the motor casing rod and place it back to its associated docking station.

It should be understood and appreciated that the docking and retrieval invention may be implemented on many devices other than 3D printers.

Therefore, a general object of this invention is to provide a retrieval and docking assembly in which multiple filaments share a common print head and which may be selectively retrieved singly for use by the print head and then docked to an associated docking station.

Another object of this invention is to provide the retrieval and docking assembly, as aforesaid, having multiple docking stations mounted in a 3D printer casing so that respective filament holders may be retrieved therefrom or docked thereto, respectively without increasing a mass or weight of the print head of the 3D printer.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
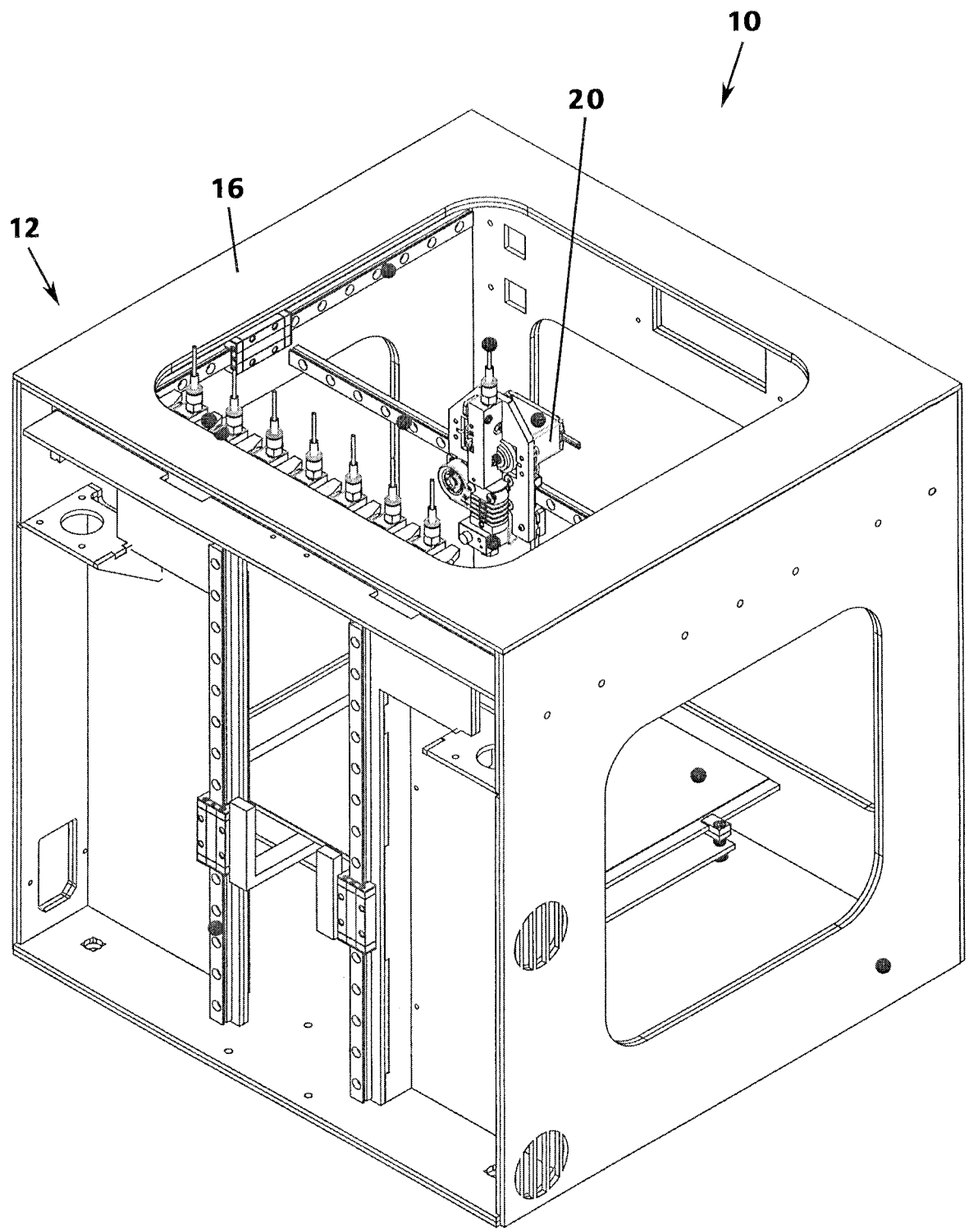
FIG. 1 is a perspective view of an assembly for docking and retrieving a filament holding device according to a preferred embodiment of the present invention, illustrated in use on a 3D printer.
Figure 2:
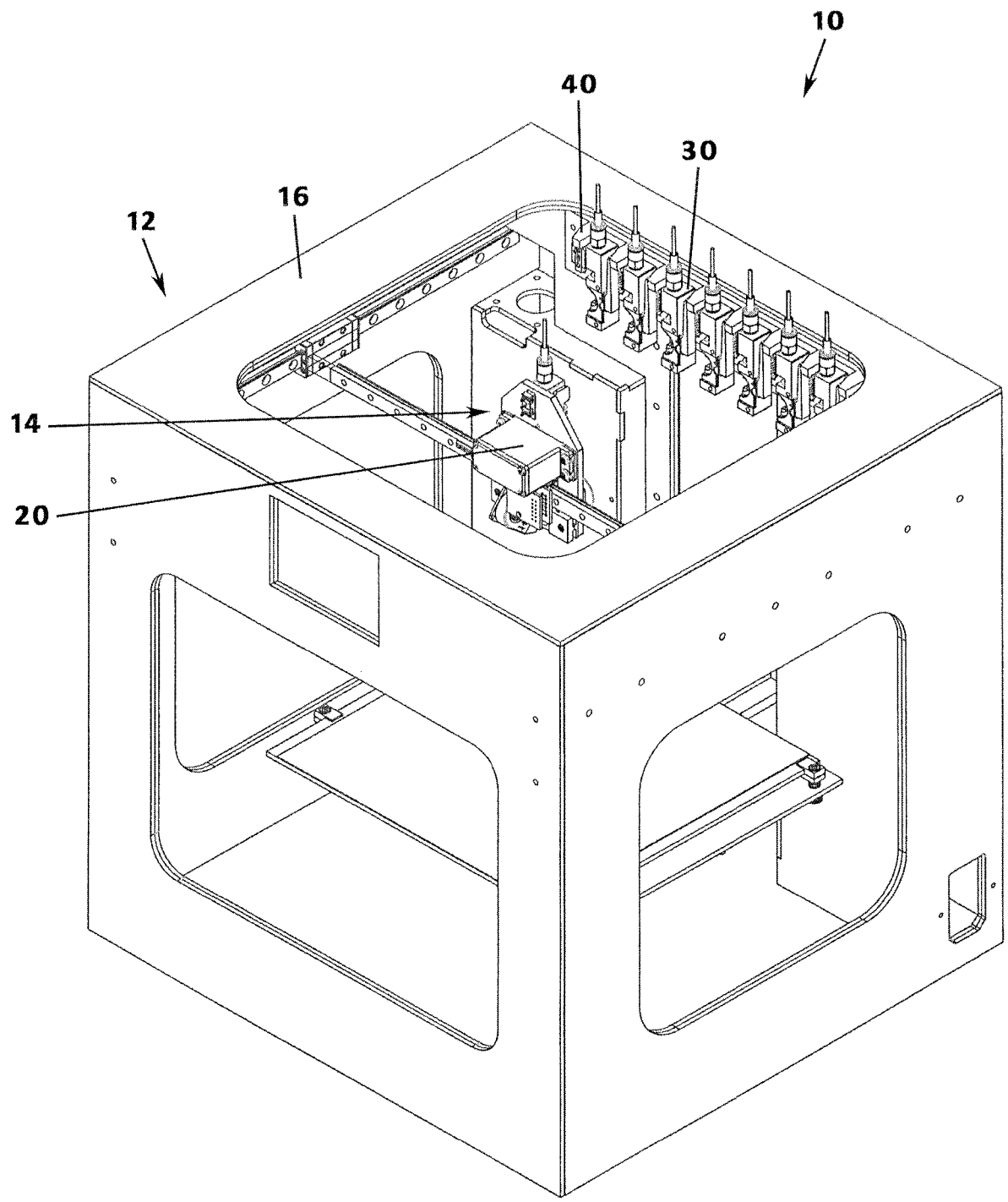
FIG. 2 is another perspective view of the assembly as in FIG. 1 from a reverse angle.
Figure 3:
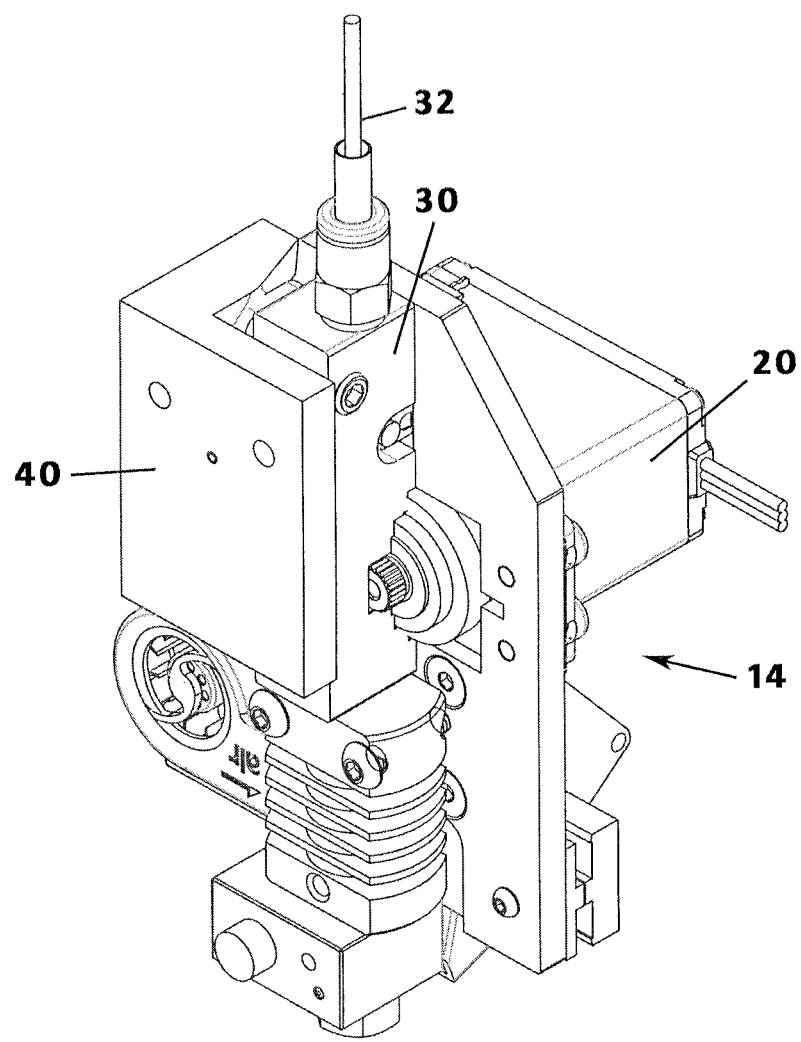
FIG. 3 is a perspective view of a motor casing, filament holder, and a docking station as in claim 2 with the printer casing removed for clarity.
Figure 4:
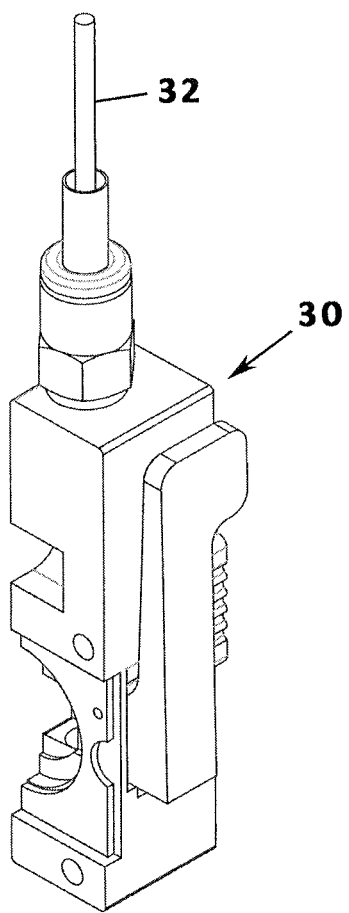
FIG. 4 is a perspective view of a filament holder removed from the printer casing of FIG. 2.
Figure 5:
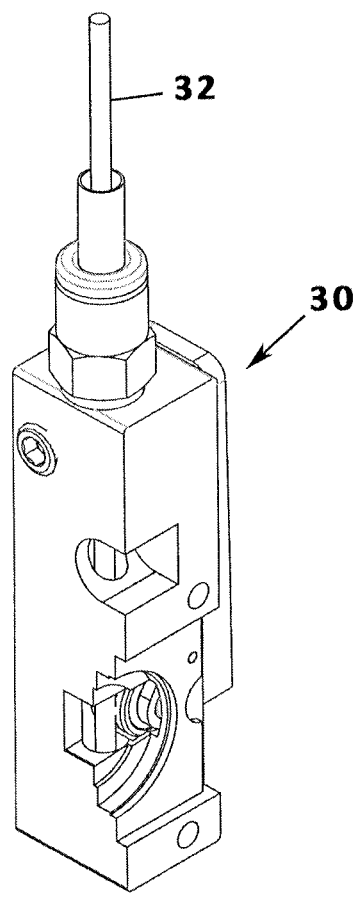
FIG. 5 is a perspective view from another angle of the filament holder as in FIG. 4.
Figure 6:
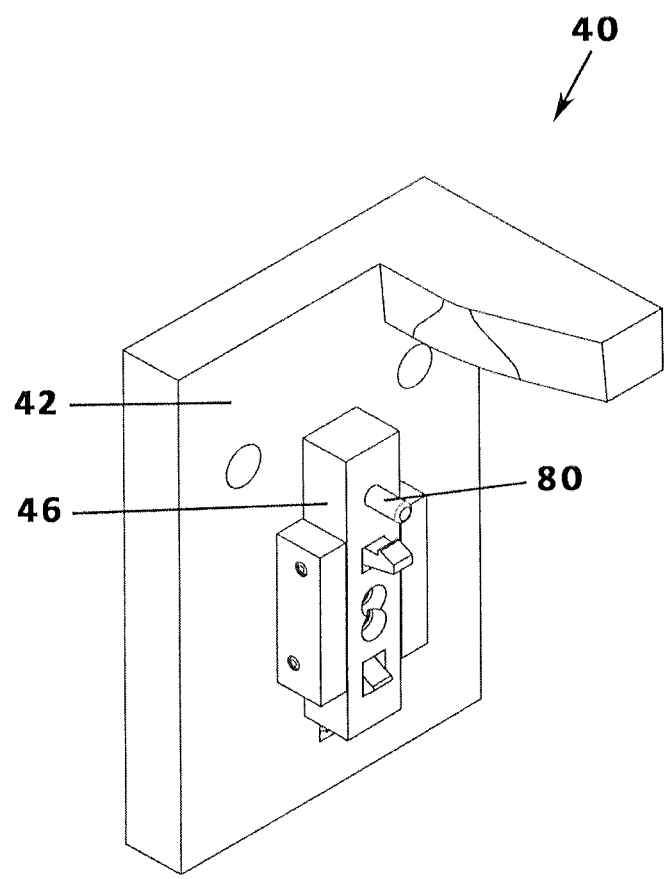
FIG. 6 is an isolated view of a docking station removed from the printer casing of FIG. 1.
Figure 7:
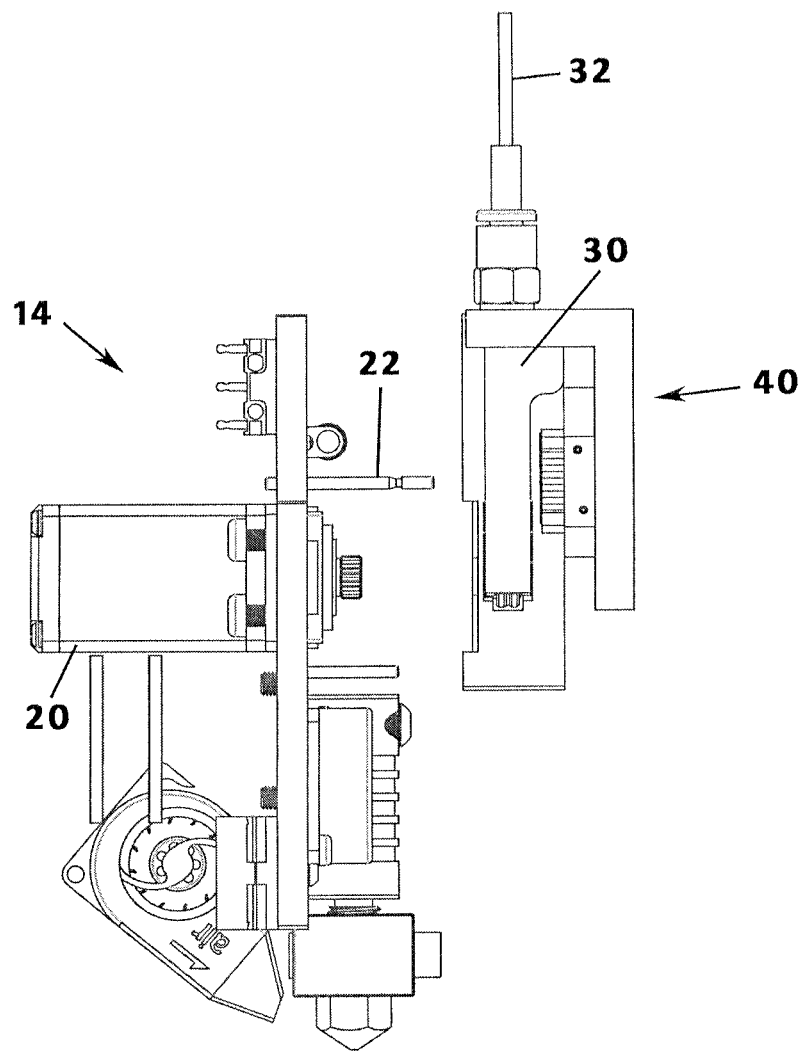
FIG. 7 is a partially exploded view of the combination shown in FIG. 3, illustrating a motor casing about to retrieve a docked filament holder.
Figure 8:
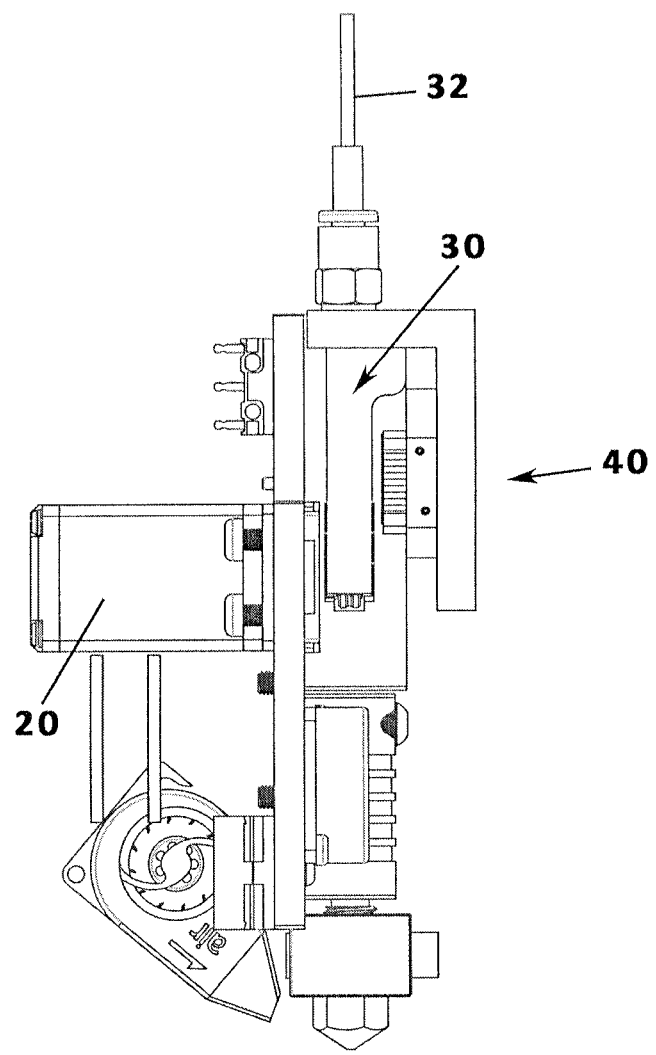
FIG. 8 is a side view of the combination as in FIG. 3.
Figure 9:
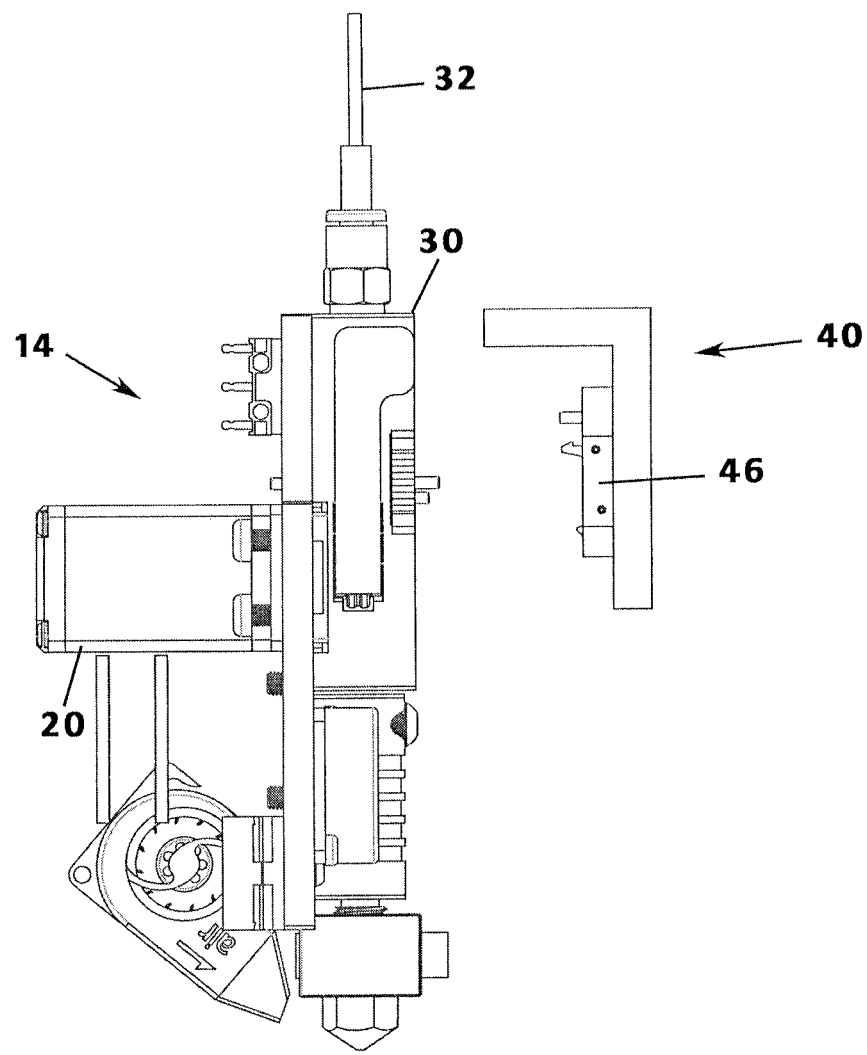
FIG. 9 is a partially exploded view of the combination shown in FIG. 3, illustrating a motor casing having retrieved a filament holder from an associated docking station.

An assembly and method for docking and retrieving a filament holding device according to a preferred embodiment of the present invention will be described in detail with reference to FIG. 1 to 25 of the accompanying drawings. The docking assembly 10 includes a plurality of docking stations 40 and a plurality of filament holders 30 positioned within a framework or casing 16 of a printing device such as a 3D printer 12. The structure and function of an exemplary docking station 40 and an exemplary filament holder 30 will be described below with the understanding that a plurality of each may be included in an embodiment and by application of the principles described herein. For instance, the description below and attached illustrations pertain to a 3D printer having a print head 14 and whose operations are programmable, such as by operation by a CAD software package running on an associated computer although the docking assembly 10 may be applied for use with other computer controlled tools to which automated docking is beneficial, such as a CNC metal cutting tool, i.e. computer controlled devices that can benefit by docking and retrieving different components for cutting or manipulating other materials.

Figure 10:
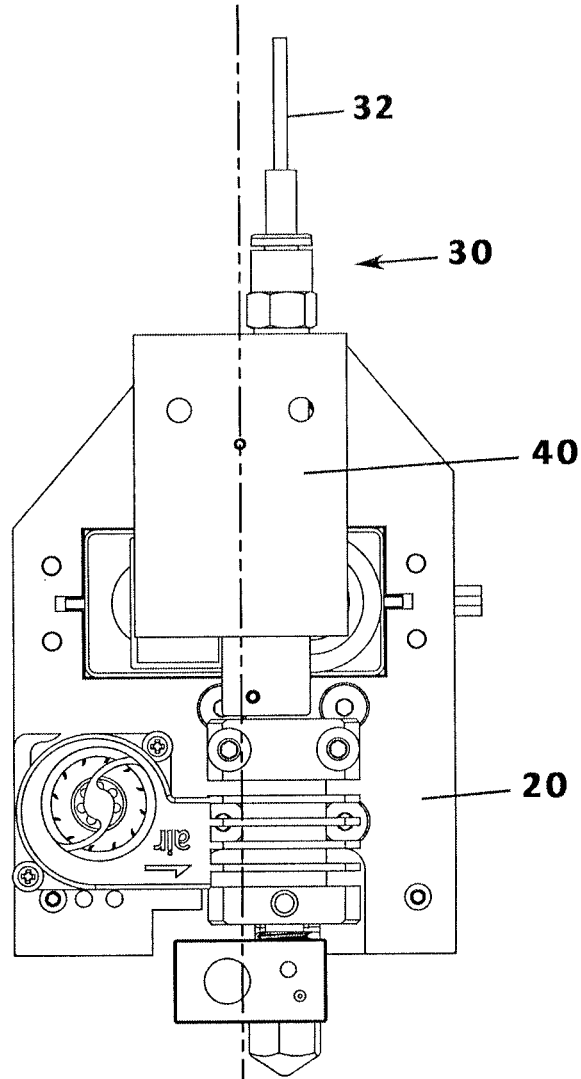
FIG. 10 is a back view of the combination as in FIG. 3.

With specific reference to the drawings and for clarity of the invention, FIGS. 11 to 15 are sectional views taken from FIG. 10 but are each progressively modified to illustrate a progression of a filament holder retrieval and docking process. Similarly, FIGS. 20 to 25 are sectional views similarly taken from FIG. 10 but are shown with the filament holder and motor casing removed for clarity and to show a progression of a filament holder retrieval and docking process.

With specific reference to an exemplary embodiment, the 3D printer 12 includes an electro-mechanical print head 14 having what will be referred to as a motor casing 20 and is configured or programmable to move front-to-back and side-to-side within a matrix of a printer housing or casing 16. In some embodiments, the print head 14 is operable to lay down thin layers of material (e.g. such as resin) coming from a filament 32, the filament 32 being held by or fed through a filament holder device, which may also referred to as a filament holder 30. Traditionally, changing or replenishing the material used for printing required the machine to be suspended while a filament holder and filament is replaced manually. By contrast, the present docking assembly 10 includes a plurality of filament holders 30 and docking stations 40 such that multiple filament holders 30—each with a particular filament—is docked into a plurality of docking stations 40, respectively, and the motor casing 20 is operable to select and retrieve a desired filament holder 30 for use in a printing operation and then return the filament holder 30 to its docking station 40, select a next filament holder 30 to retrieve, and so on.

It is understood that the structures described in association with filament holder and other structures in association with a docking station that, together, comprise a latching and docking assembly may be reversed without departing from the spirit of the present invention. It is intended that a reversal of the structures described herein and recited in the claims would be interpreted as a substantial equivalent of the claims recited herein.

Now, more particularly, the docking assembly 10 includes a motor casing rod 22 having a proximal end 24 coupled to a motor casing 20, such as to a motor portion operable for moving a print head 14. The motor casing rod 22 has a linear configuration extending away from the motor casing 20, extends perpendicular to the motor casing 20, and has a distal end 26 opposite the proximal end 24. Further, the motor casing rod 22 may define a recess 28 or recessed area proximate the distal end 26, the recess being operable in coupling the motor casing rod 22 to a filament holder 30 as will be described in greater detail later.

Preferably, the docking assembly 10 may include a plurality of filament holders 30 as shown in FIG. 1 so that multiple filaments 32 may be available for complex 3D printing jobs requiring two or more resins, colors, or the like. More particularly, each filament holder 30 includes one or more housing walls that, collectively, define a filament receiver channel 34 having a configuration capable of receiving the motor casing rod 22 therein (distal end first), such as during a docking or retrieving operation. It will be understood that, preferably, the motor casing rod 22 and filament receiver channel 34 have complementary cylindrical configurations although other shape configurations may also work. It is also understood that a channel may be defined or formed by the material around it or may be an actual tubular component dimensioned to receive a respective rod therein.

Figure 13:
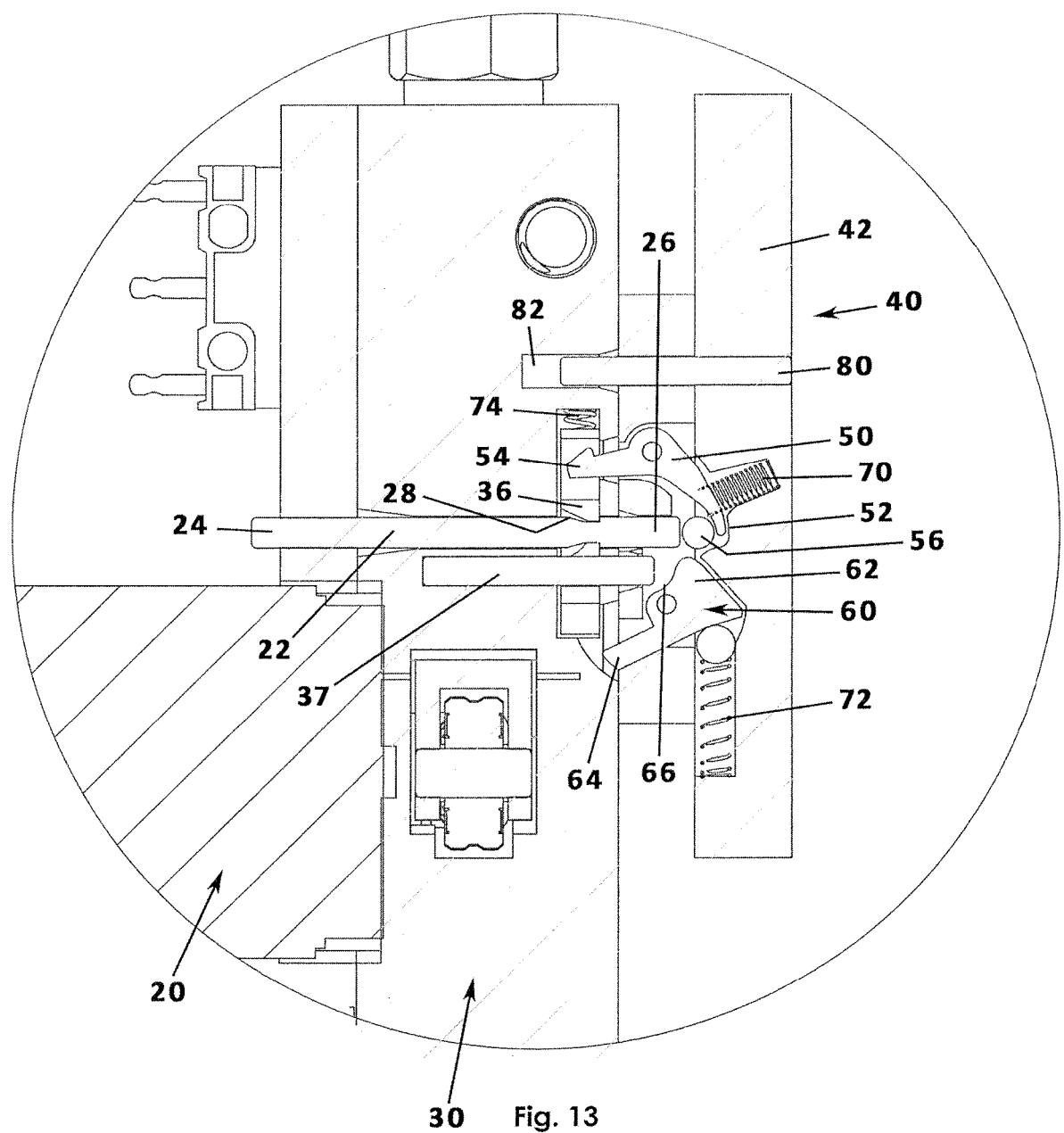
FIG. 13 is a sectional view as in FIG. 12, illustrating the motor casing rod fully inserted through a filament receiver channel and fully inserted into a docking receiver channel, i.e. illustrating a coupling of the filament holder and motor casing rod.
Figure 14:
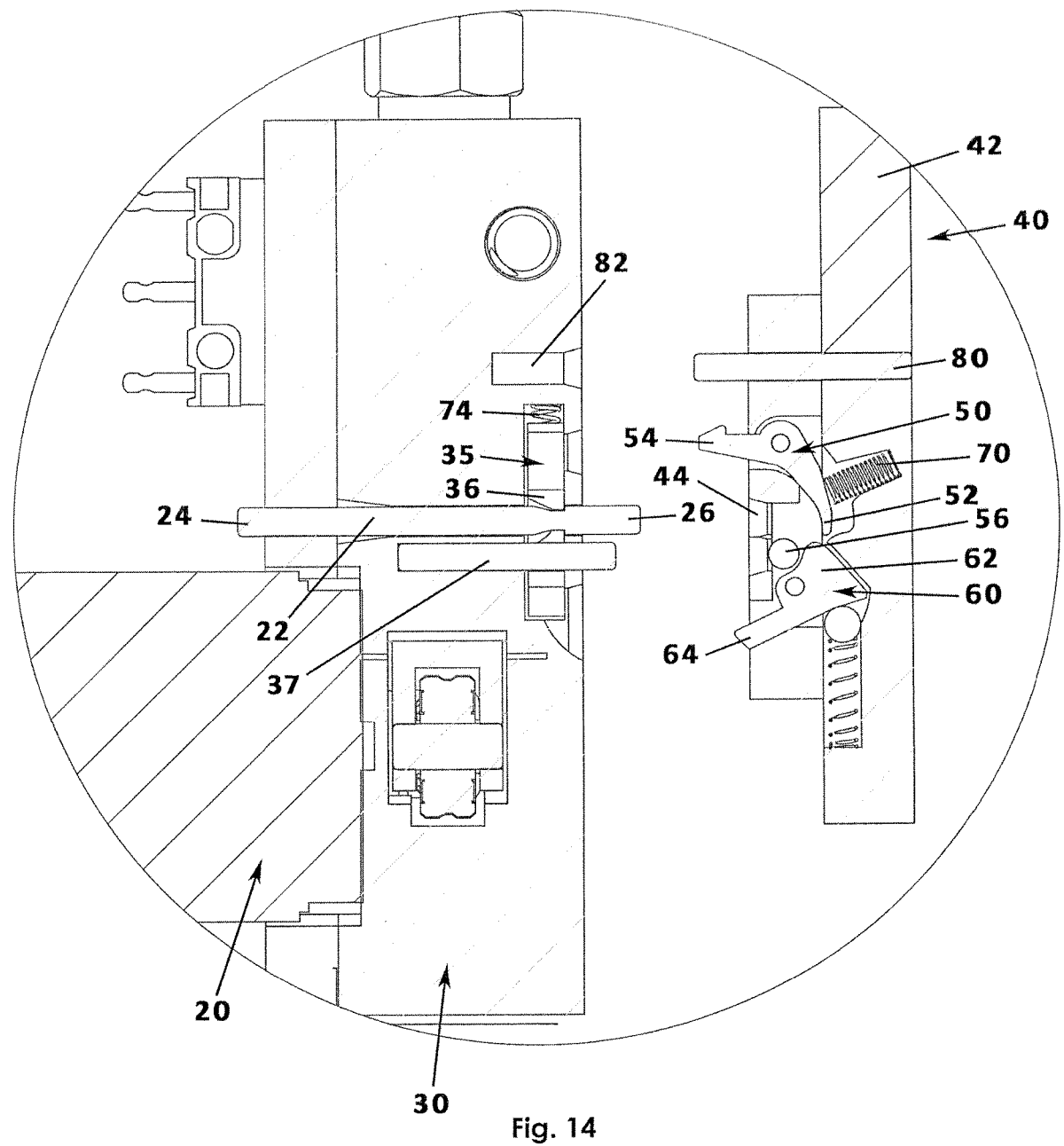
FIG. 14 is a sectional view as in FIG. 13, illustrating a captured filament holder and motor housing pulling away from an associated docking station.
Figure 17:
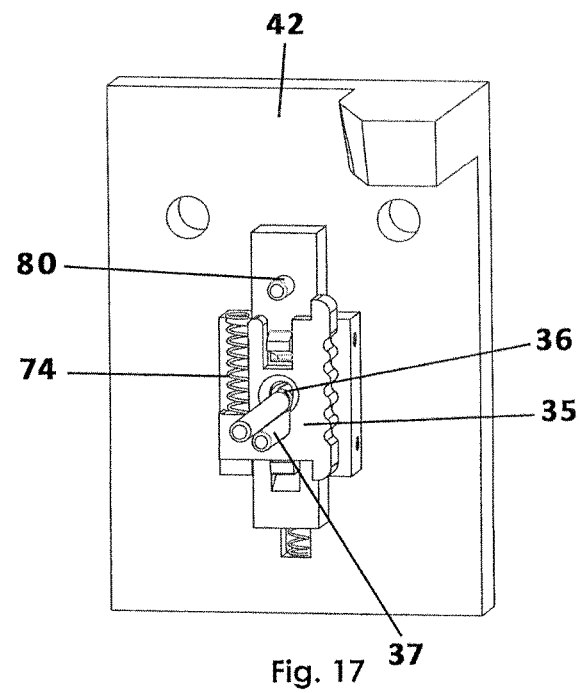
FIG. 17 is a perspective view as in FIG. 15, but with the filament holder and motor casing removed for clarity, illustrating the motor casing rod fully inserted through a filament receiver channel and docking receiver channel and the filament rod actuating a release lever to disengage the coupling or capture between the filament holder and motor casing rod, i.e. illustrating a docking action.
Figure 18:
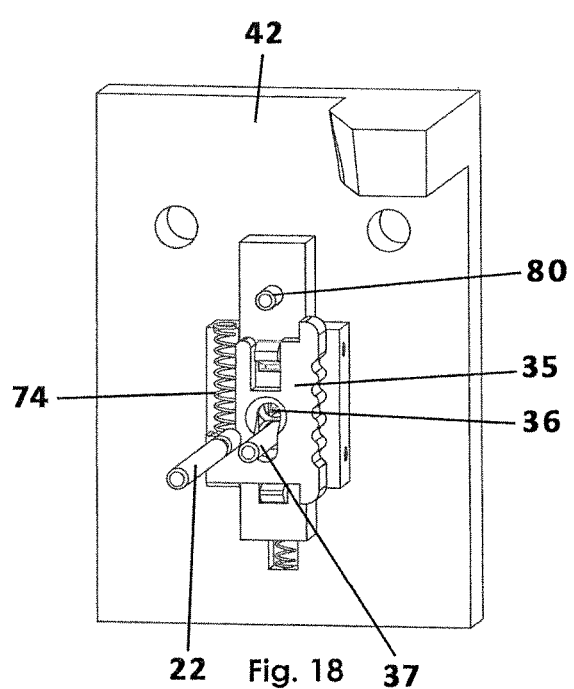
FIG. 18 is a perspective view as in FIG. 11 but with the filament holder and motor casing removed for clarity, illustrating the motor casing rod being approaching a filament receiver channel but not yet fully inserted into a docking receiver channel, i.e. illustrating the start of a filament holder retrieval.
Figure 19:
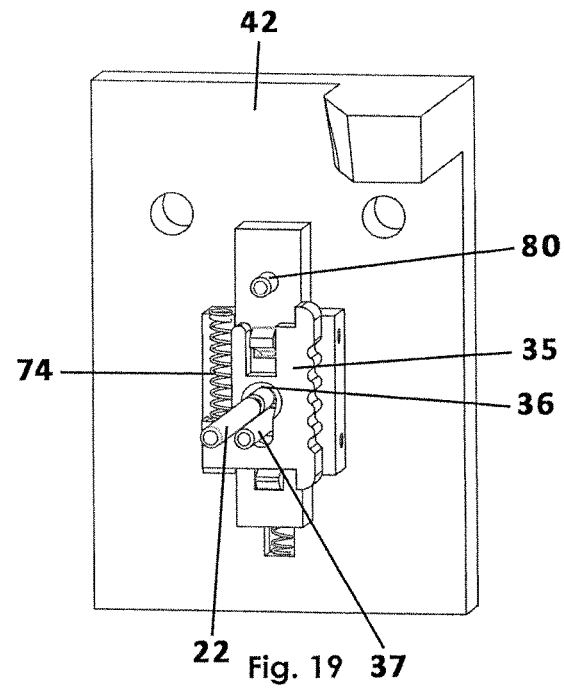
FIG. 19 is a perspective view as in FIG. 12 but with the filament holder and motor casing removed for clarity, illustrating the motor casing rod inserted through a filament receiver channel but retracting away from a docking receiver channel, i.e. illustrating the conclusion of a filament holder retrieval.
Figure 20:
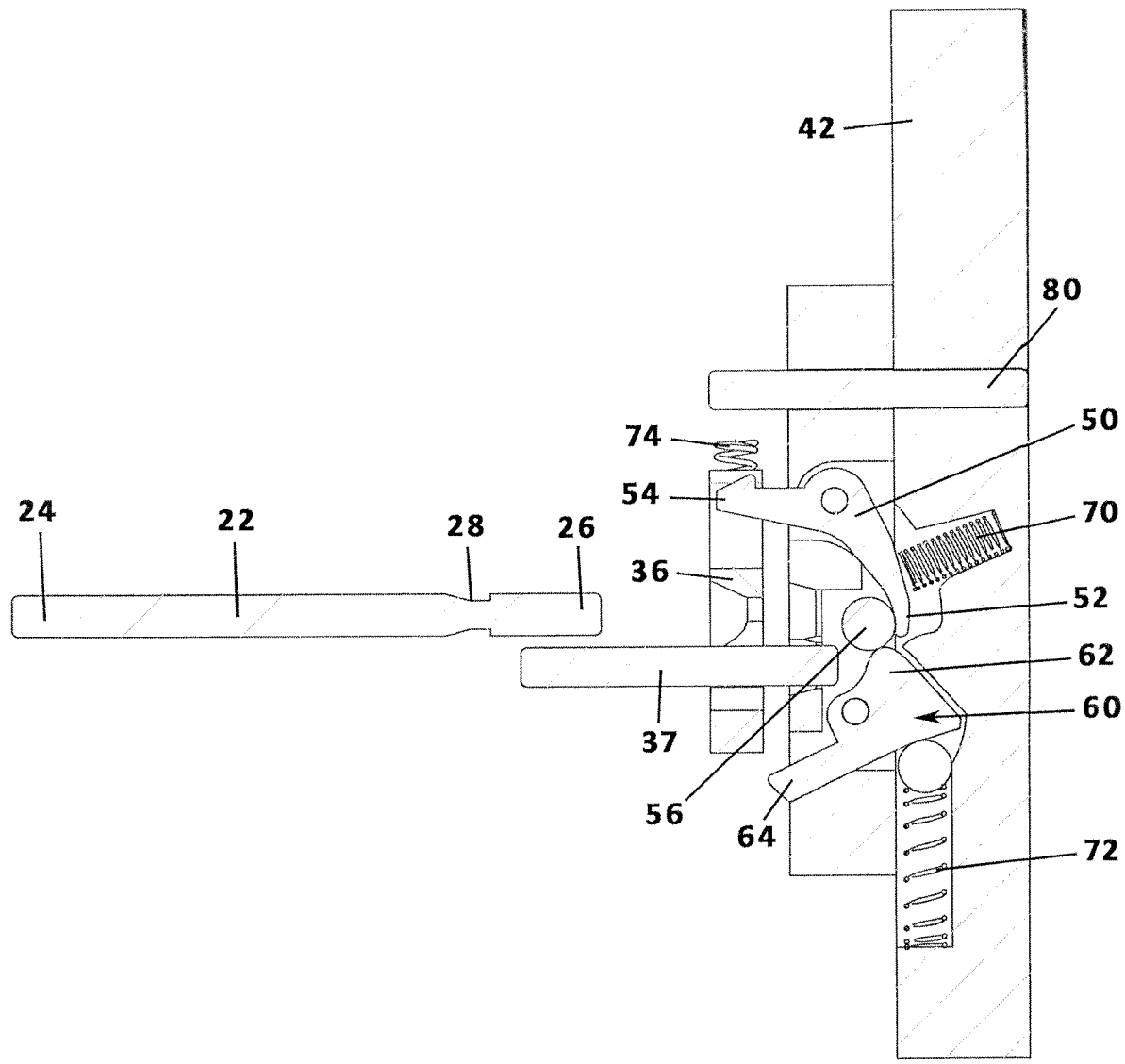
FIG. 20 is a sectional view as in FIG. 11 but with the filament holder and motor casing removed for clarity, illustrating a motor casing approaching a filament holder docked in an associated docking station.
Figure 21:
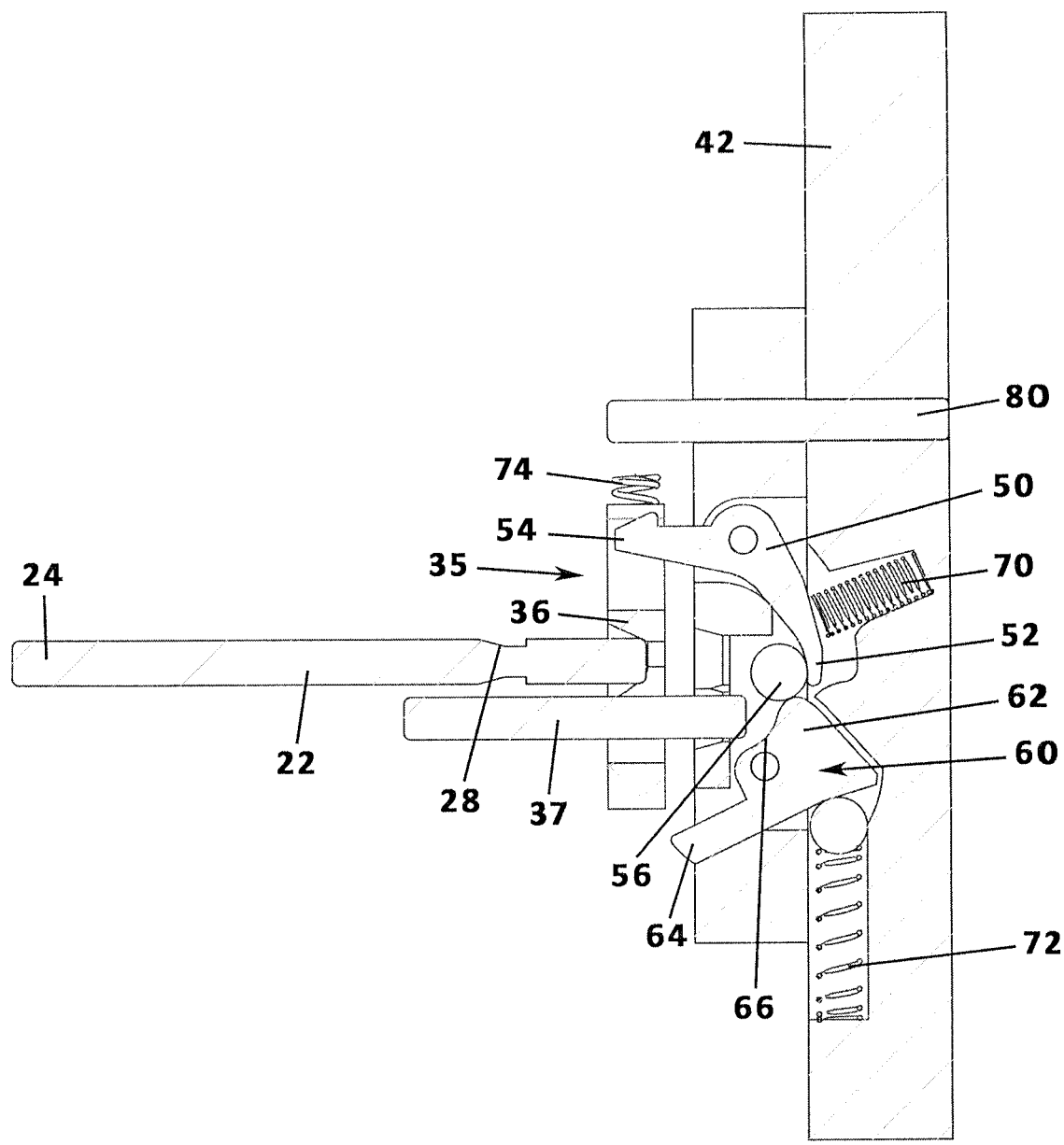
FIG. 21 is a sectional view as in FIG. 12, illustrating the motor casing rod inserted through a filament receiver channel but not yet fully inserted into a docking receiver channel, i.e. illustrating the start of a filament holder retrieval.
Figure 22:
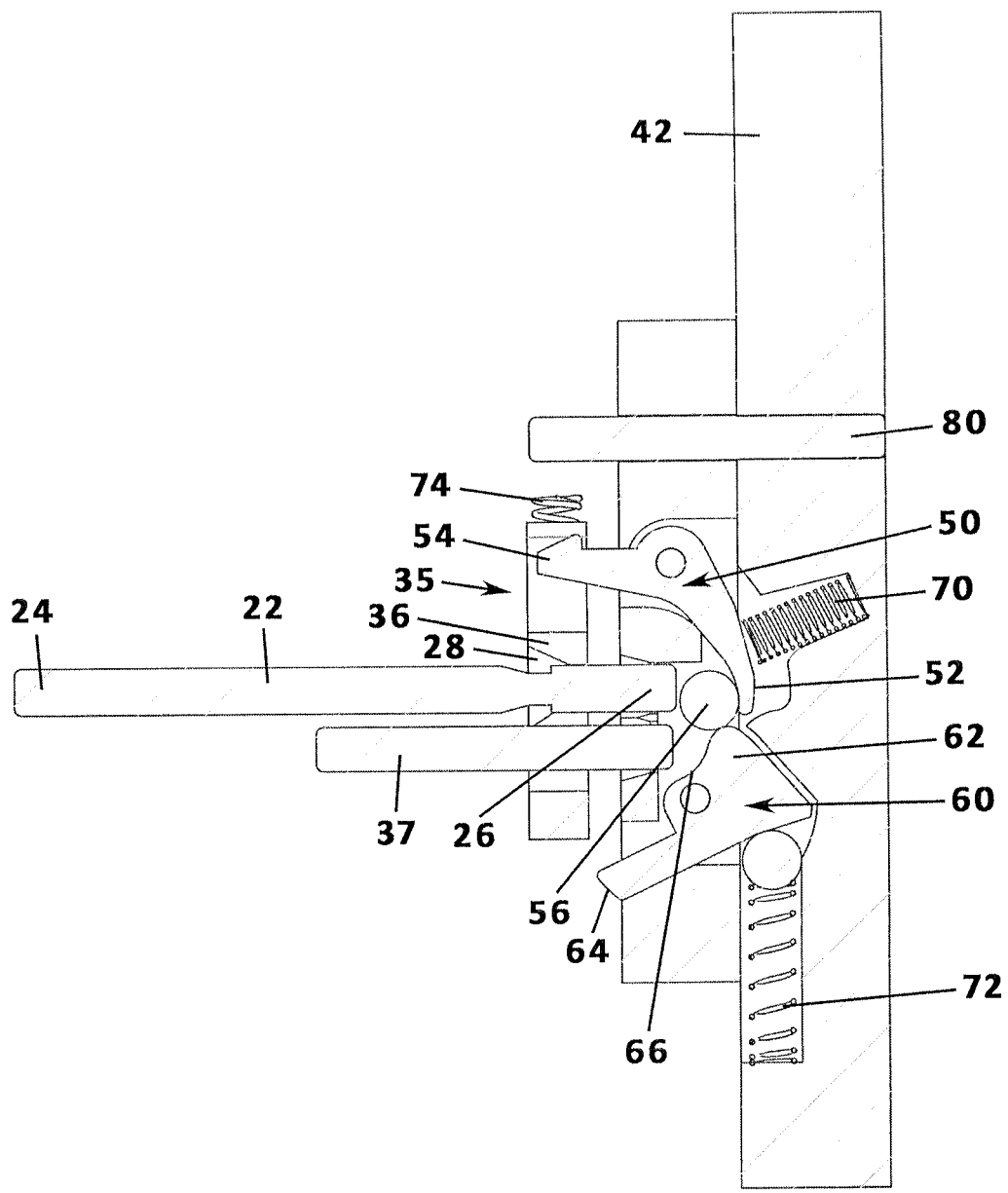
FIG. 22 is a sectional view as in FIG. 13, illustrating the motor casing rod fully inserted through a filament receiver channel and partially inserted into a docking receiver channel, i.e. illustrating the start of a coupling of the filament holder and motor casing rod.
Figure 23:
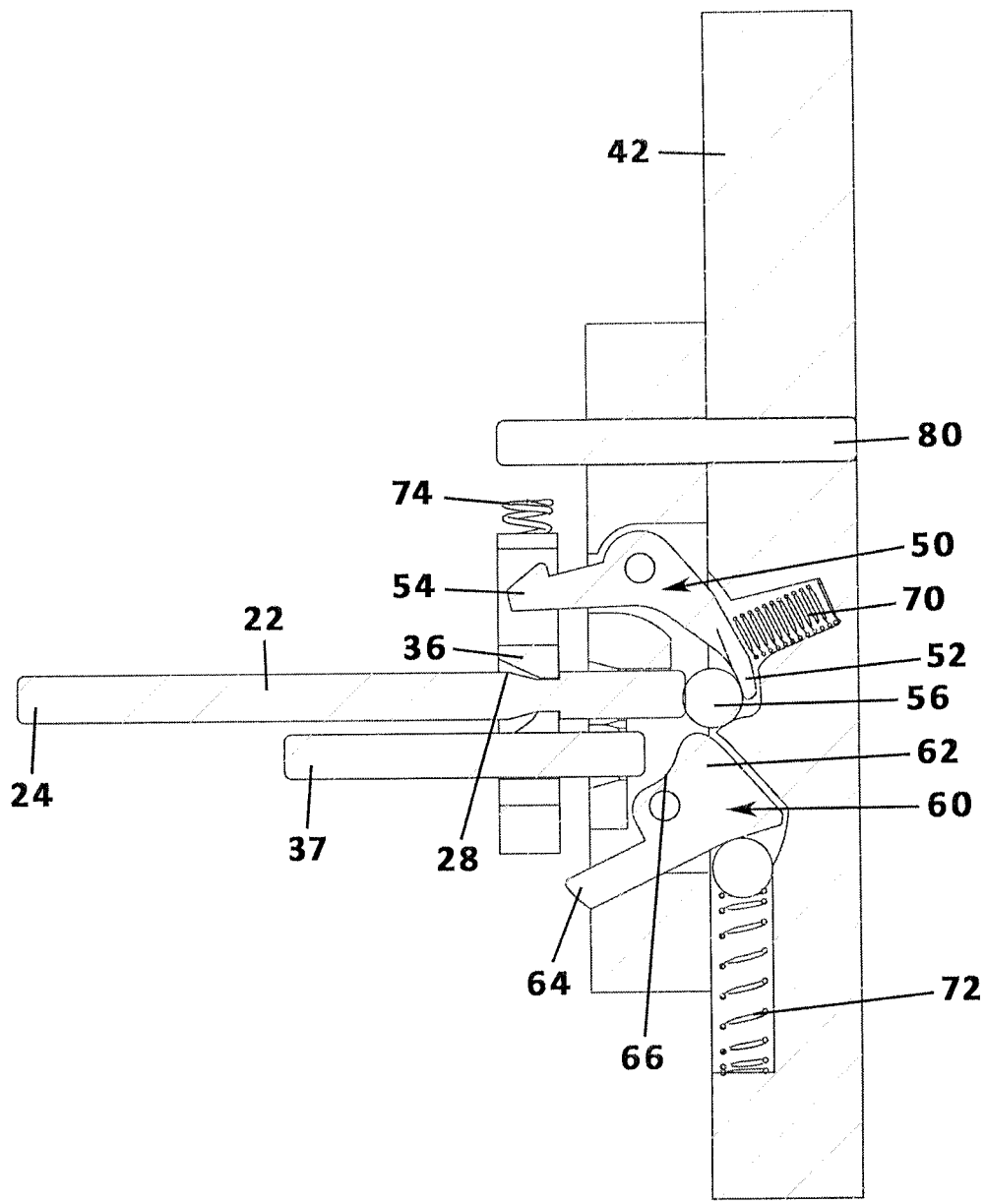
FIG. 23 is a sectional view as in FIG. 13, illustrating the motor casing rod fully inserted through a filament receiver channel and fully inserted into a docking receiver channel, i.e. illustrating a coupling (capture) of the filament holder and motor casing rod.

The filament holder 30 defines an interior area and a stop assembly positioned therein, the stop assembly 35 having a stop member 36 that is slidably movable between a retracted configuration in which the stop member 36 is disengaged and displaced from the recess 28 of the motor casing rod 22 and a deployed configuration in which the stop member 36 is engaged with and releasably coupled to the recess 28 of the motor casing rod 22 (FIG. 23). The stop member may also be referred to as a "catch" as its engagement with the motor casing rod effectively catches or captures a filament holder from its docking station. When engaged, the filament holder 30 may be removed from its associated docking station 40, respectively, by a programmed movement of the print head 14. As will be described later in more detail, once the motor casing rod 22 has engaged a respective filament holder 30, the filament holder 30 may be removed and used in a printing process and then later released and "parked" to its docking station 40 and a different filament holder 30 may be engaged. For an even better understanding of the filament holder 30, the stop member 36 is just an edge or flange portion of a larger stop assembly 35 which is movable up or down by compression spring 74 and as urged by the release member 60 as shown in FIGS. 13, 14, and 17.

Figure 12:
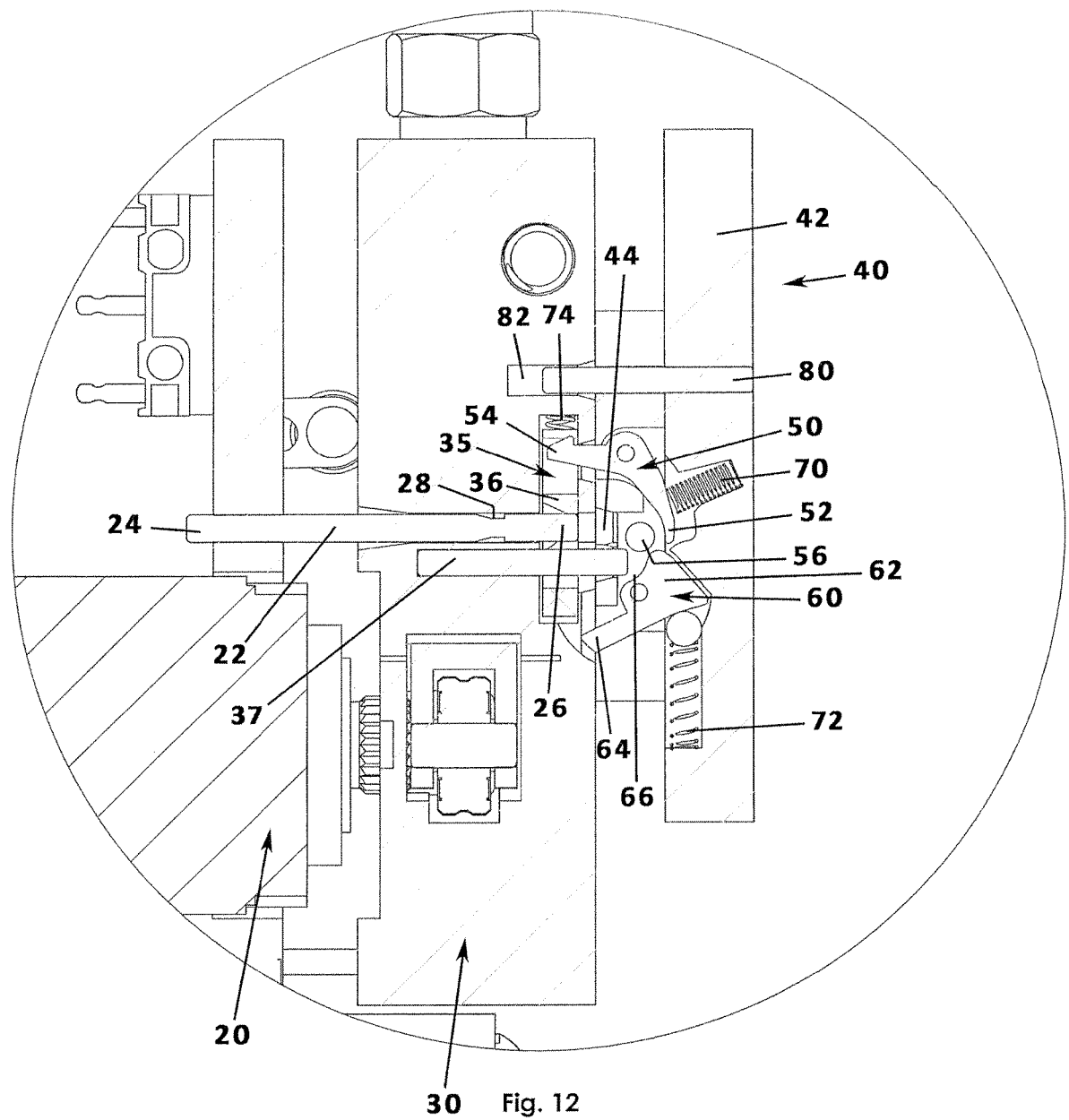
FIG. 12 is a sectional view as in FIG. 11, illustrating the motor casing rod inserted through a filament receiver channel but not yet fully inserted into a docking receiver channel, i.e. illustrating the start of a filament holder retrieval.

Each filament holder 30 further includes a filament rod 37 similar in structure to the motor casing rod 22 described above and, in fact, is downwardly parallel to the motor casing rod 22 when the motor casing rod 22 is inserted into the docking station 40 as described below. The filament rod 37 is critical to the release of a filament holder 30 during a docking procedure. More particularly, it will be the filament rod 37 which will prevent the actuator 56 from falling atop the release lever 60 as shown in FIGS. 12 and 13 and explained later regarding a release procedure.

A plurality of docking stations 40 may be mounted in the printer casing 16, such as of a 3D printer, each being associated with a filament holder 30 that may docked therein according to, but not limited to, an exemplary embodiment of the present invention. More particularly, a particular docking station 40 may include a docking wall 42 that includes, forms, or defines a docking receiver channel 44 having a configuration complementary to and capable of receiving the motor casing rod 22 (distal end 26 first). As will be seen, the motor casing rod 22 may be received into the filament receiver channel 34 and then into the docking receiver channel 44 when a filament holder 30 is being docked following use or retrieved for use. Further, a framework 46 extends away from the docking wall 42 and is necessary in facilitating a docking or retrieval procedure. It is understood that the framework 46 of a docking station 40 may include multiple walls and referred to as a docking station housing.

In an exemplary embodiment, a deployment latch 50 may be pivotally coupled to the framework 46, has a generally arcuate or rim-shaped configuration, and has a first end 52 and a second end 54. Preferably, the deployment latch 50 is moved from a normally retracted or at-rest configuration to a deployed configuration. In the exemplary embodiment described herein, the deployment latch 50 is pivotally rotated in a counter-clockwise direction from an unrotated configuration (a normally at-rest configuration and referred to as the retracted configuration) to a rotated configuration (referred to as the deployed configuration) in which the second end 54 of the deployment latch pushes on the stop member 36 and causes the stop member 36 to engage the recess 28 of the motor casing rod 22. Rotation of the deployment latch 50 occurs only when the motor casing rod 22 is fully inserted through the filament receiver channel 34 and docking receiver channel 44. In summary, the motor casing rod 22 is inserted through a filament holder 30 and into the docking station 40 associated with the respective filament holder, insertion of the rod 22 causing the stop member 36 to engage the recess 28 of the motor casing rod 22—effectively enabling a print head 14 to capture a respective filament holder 30 (FIG. 13) and retreat with it for use (FIG. 14).

Figure 24:
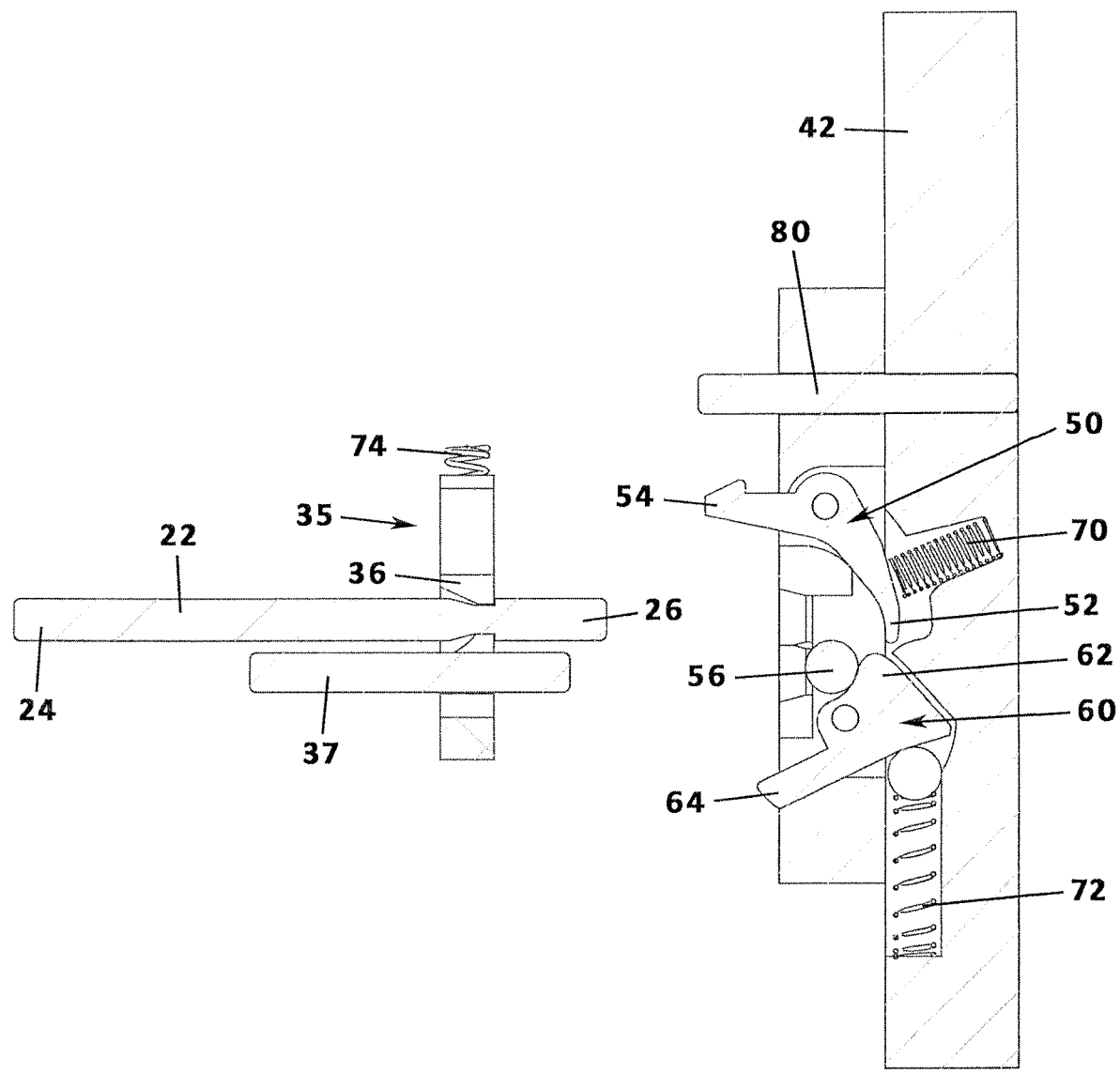
FIG. 24 is a sectional view as in FIG. 11, illustrating a motor casing and capture filament holder approaching an associated docking station, i.e. illustrating the start of a docking and release process.
Figure 25:
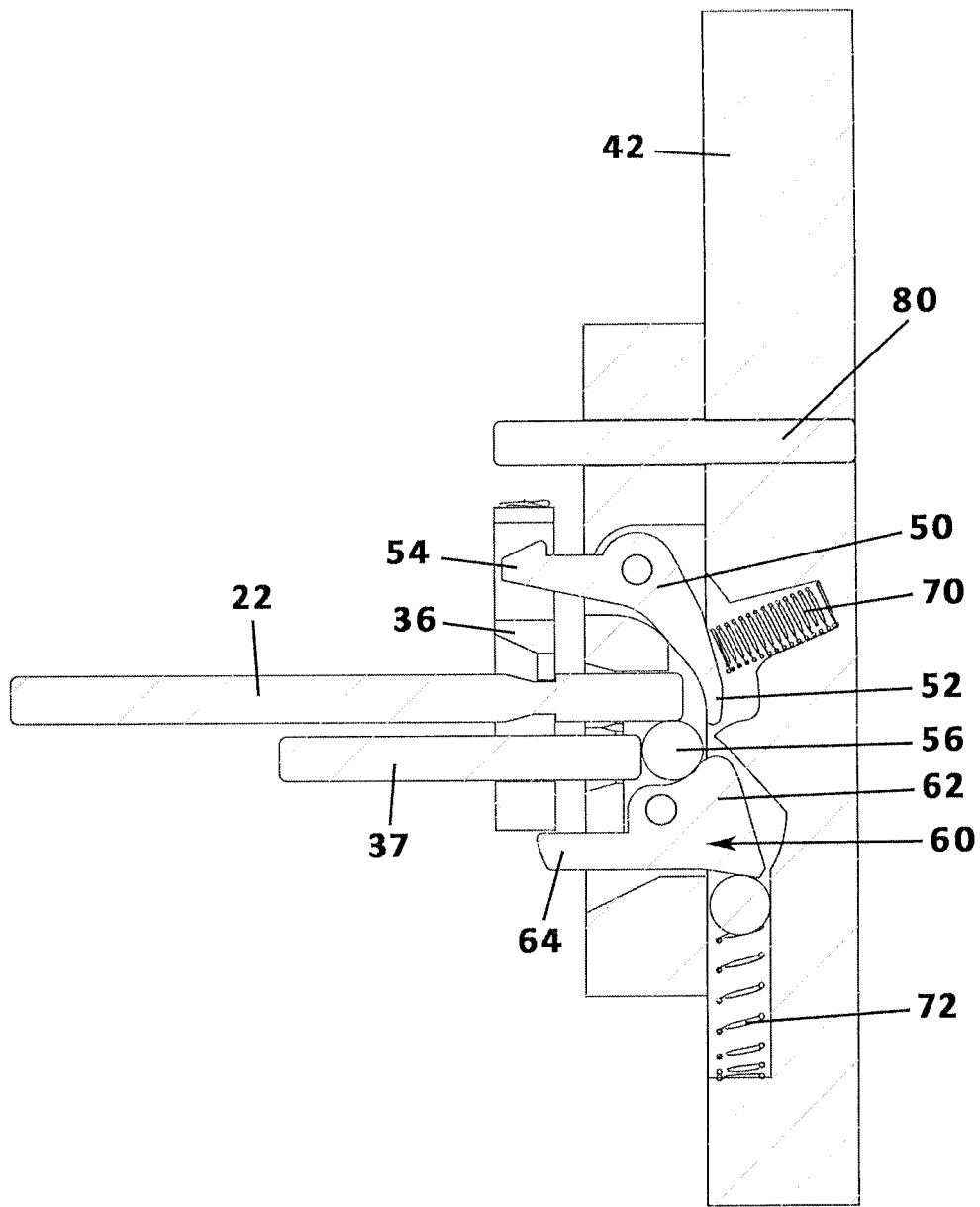
FIG. 25 is a sectional view as in FIG. 15, illustrating the motor casing rod fully inserted through a filament receiver channel and docking receiver channel and actuating a release lever to disengage the coupling or capture between the filament holder and motor casing rod, i.e. illustrating a docking action.

Now with even more detail regarding the rotation of the deployment latch 50, an actuator 56 (also referred to as a floating actuator or floating actuator ball) may be positioned in the docking receiver channel 44 proximate the first end 52 thereof. The actuator 56 may be in the form of a spherical object such as a ball and is movable between a docking configuration adjacent the first end 52 of the deployment latch 50 (FIGS. 11 to 13 and FIGS. 20 to 23) and a releasing configuration atop a release lever 60 (FIG. 24 to 25). The position of the actuator 56 will determine if insertion of the motor casing rod 22 causes a deployment/retrieval of an associated filament holder 30 or a release/docking of an associated filament holder 30. It should be appreciated that the actuator 56 naturally falls from its normal start configuration and onto or adjacent the release lever 60 after the actuator 56 has pushed or actuated the deployment latch to rotate and cause the stop member 36 to engage the motor casing rod 22. As explained previously, the filament rod 37 extends into the docking station 40 and blocks the actuator 56 from falling atop the release lever 60 until the motor casing rod 22 is fully inserted during a retrieval process (FIG. 12).

Figure 15:
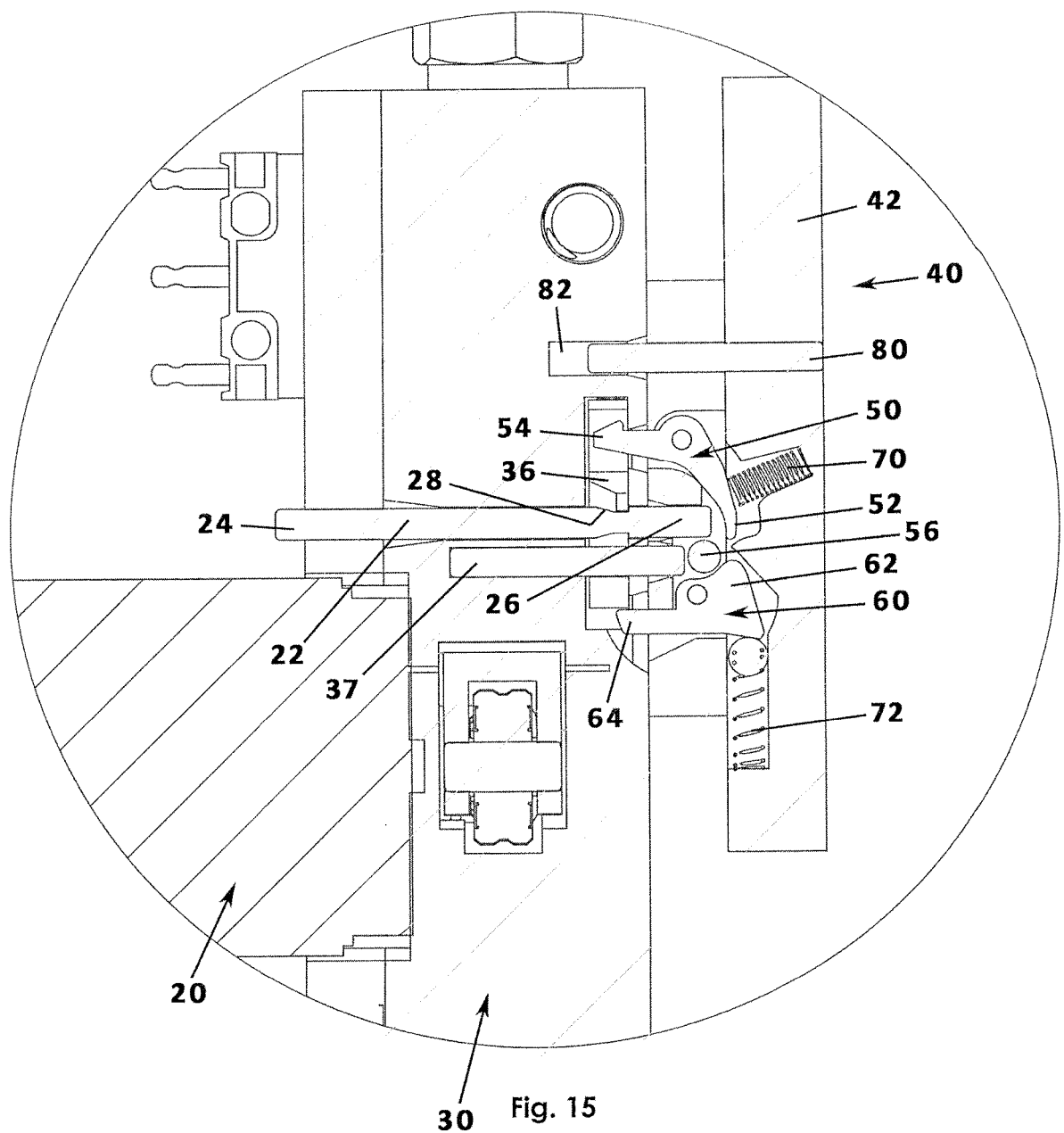
FIG. 15 is another sectional taken along line 11-11 of FIG. 10, illustrating the motor casing rod fully inserted through a filament receiver channel and docking receiver channel and the filament rod actuating a release lever to disengage the coupling or capture between the filament holder and motor casing rod, i.e. illustrating a docking action.
Figure 16:
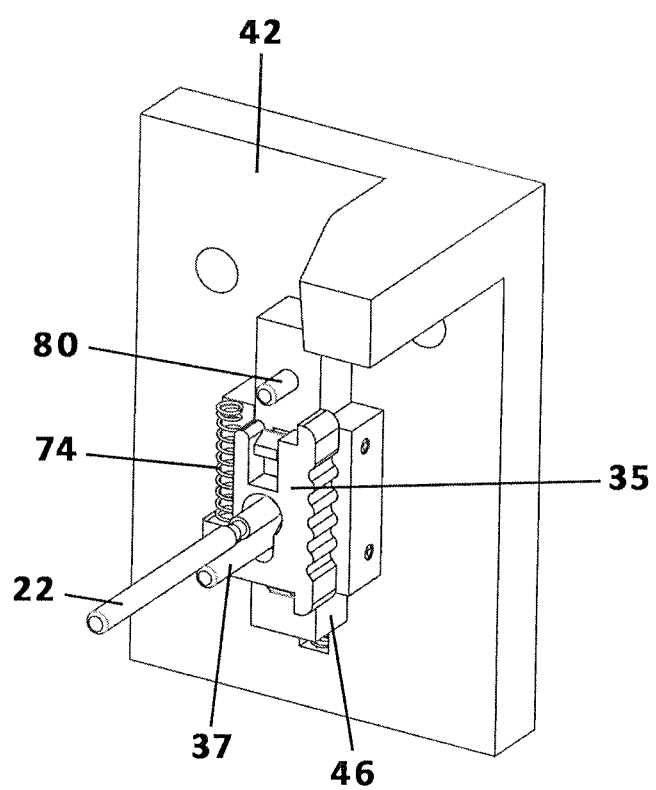
FIG. 16 is a perspective view as in FIG. 11 but with the filament holder and motor casing removed for clarity, illustrating the motor casing rod being inserted through a filament receiver channel but not yet fully inserted into a docking receiver channel, i.e. illustrating the start of a filament holder retrieval.

With further reference to the release lever 60, the release lever 60 movable between a retracted and unactuated configuration and a deployed or actuated configuration. Specifically, he release lever 60 may also include a generally arcuate configuration and is pivotally coupled to the framework 46 of an associated docking station 40 and is displaced from the docking latch 50 described above. The release lever 60 includes a first end 62 and a second end 64. When the actuator 56 is positioned adjacent the first end 62 of the release lever 60 and the motor casing rod 22 is inserted fully, the filament rod 37 of the filament holder 30 being docked/released bears against the actuator 56 to bear against the release lever 60, causing the release lever 60 to rotate in a clockwise direction such that the second end 64 of the release lever 60 bears against an engaged stop member 36 (FIG. 15). This action may also be described as actuating or moving the release lever to a deployed configuration. By this, the stop member 36 is disengaged or released from the recess 28 of the motor casing rod 22. In other words, a respective filament holder 30 is "released" from the motor casing rod 22 and the print head 14 in general.

Described in further detail, the release lever 60 includes a top surface 66 that forms or defines a recessed area that is configured and operable to receive the floating actuator 56 when the floating actuator moves (falls) to the releasing configuration (FIGS. 12 to 14 and FIG. 24). In other words, the actuator 56 falls atop or immediately adjacent the release lever 60 (FIG. 14) as the retrieved filament holder 30 is pulled away by the motor casing 20 after a retrieval. Then, the floating actuator 56 is in position to be urged to rotate the release lever 60 when the filament holder 30 is returned later, i.e. so that the release lever 60 is urged or actuated to rotate (i.e. is deployed) when the filament rod 37 is inserted into the docking receiver channel 44 during a docking process (FIG. 15).

Strategically positioned compression springs naturally biases the docking latch 50, the release lever 60, and the stop member 36 to their naturally at-rest configurations as described above, the springs being compressed when the docking latch 50 and release lever 60 are rotated. More particularly, a first compression spring 70 normally biases the docking latch toward the unrotated configuration. Similarly, a second compression spring 72 normally biases the release lever 60 toward the unrotated configuration. A third compression spring 74 normally biases the release lever 60 toward the deployed configuration.

Although the exemplary embodiment described herein utilizes an arcuate-shaped deployment latch and release lever, it is understood that equivalent latch and release components according to other embodiments having slidable components and engagements (capture or release), perpendicular components and engagements, and the like, are also contemplated as providing docking, retrieval, and release assemblies in the spirit of the present invention and as may be described and recited in related applications (i.e. continuation-in-part applications, divisional, and the like).

In addition, the docking assembly 10 may include one or more guide pins and associated guide channels for aligning and guiding related and associated components. For instance, each docking station 40 includes a guide pin 80 extending away from the associated docking wall 42 and is situated perpendicular thereto. Each filament holder 30 includes or its walls define a guide channel 82 having a shape configuration that is complementary to and operable to receive the guide pin 80 therein. In use, when a filament holder 30 is being returned after use, the guide channel 82 of the filament holder 30 mates with the associated guide pin 80 of a respective docking station 40 to be sure the release method described above is carried out correctly and as described.

Figure 11:
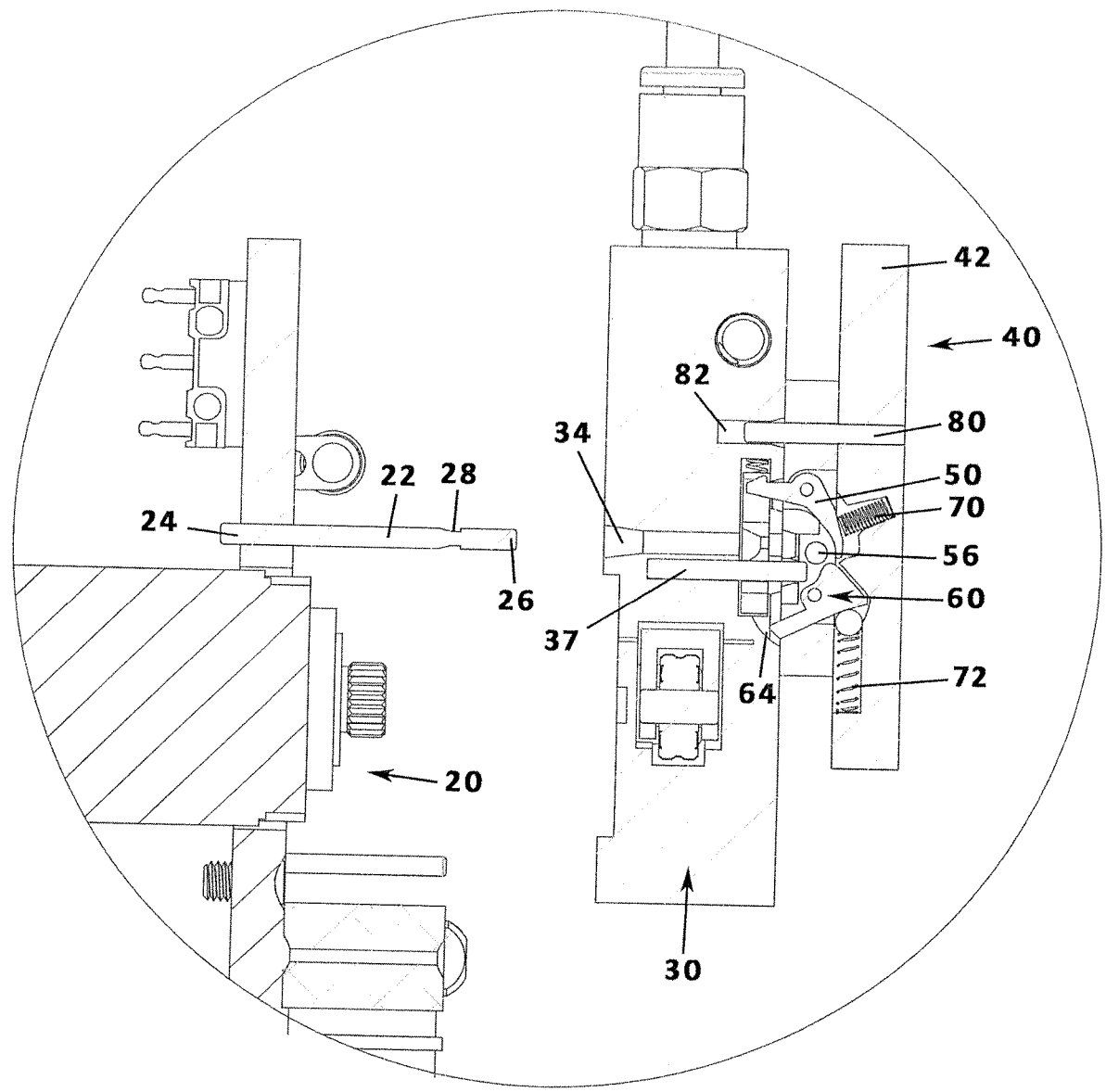
FIG. 11 is a sectional view taken along line 11-11 of FIG. 10, illustrating a motor casing approaching a filament holder docked in an associated docking station.

A method for docking and retrieving a plurality of filament holders and a plurality of associated docking stations is essentially an organized combination of the functions of the components described above. It will be appreciated that for clarity that a particular or individual filament holder 30 of a plurality of filament holders may be referred to as a "respective filament holder" and that a particular or individual docking station 40 of a plurality of docking stations may be referred to as a "respective docking station." Specifically, the motor casing such as of a 3D printer 12 includes a motor casing rod 22 operable for insertion through a filament receiver channel 34 and docking receiver channel 44 associated with an associated or respective filament holder 30 and respective docking station 40. FIG. 11 illustrates a motor casing 20 moving toward a docking station 40 before retrieving the associated filament holder 30. A complete insertion of the motor casing rod 22 causes the docking latch 50 to rotate (i.e. to deploy) so as to engage and couple the filament holder 30 to the motor casing rod 22. The captured filament holder 30 may then be removed or retracted from its docking station 40 (FIG. 14) and be used, such as by the print head 14 of a 3D printer 12. As indicated above, a complete reversal of the location of these components is contemplated and within the spirit and interpretation of the present claims of novelty.

When finished, the motor casing 20 is operable or programmed to return the filament holder 30 to its associated docking station 40. But this time, a complete insertion of the motor casing rod 22 results in actuation of the release lever 60 (by action of the filament rod 37 engaging the actuator 56 to cause the release lever 60 to rotate) to release the stop member 36 from engagement with the motor casing rod 22 and the filament holder 30 is released back to its docking station 40 and the motor casing 20 pulls away by itself and with no filament holder 30 (FIG. 11).

It is understood that while certain forms of this invention have been illustrated and described, it is not limited thereto except insofar as such limitations are included in the following claims and allowable functional equivalents thereof.

The invention claimed is:

1. A docking assembly for docking and retrieving a filament holder from a printing device of a type having a printing head, said docking assembly comprising:
    a motor casing rod having a proximal end coupled to a motor casing associated with the printing head and a distal end opposite said proximal end, said motor casing rod having a linear configuration and extending away from said motor casing, said motor casing rod defining a recess proximate said distal end;
    the filament holder defining a filament receiver channel operable for selectively receiving said motor casing rod;
    wherein said filament holder includes a stop member that is movable between a retracted position displaced from said recess of said motor casing rod and a deployed configuration engaged with said recess of said motor casing rod when said motor casing rod is fully extended through said filament receiver channel;
    a docking station, comprising:
        a docking wall defining a docking receiver channel that is collinear and in communication with said filament receiver channel and operable for receiving said motor casing rod;

a framework extending away from said docking wall;
a deployment latch coupled to said framework and includes first and second ends, said deployment latch being operable to move from a normally retracted configuration to a deployed configuration when said motor casing rod is fully inserted into said docking receiver channel during a retrieval process so that said second end of said deployment latch urges said stop member to move to said deployed configuration for coupling together said motor casing rod and said filament holder.

2. The docking assembly as in claim 1, wherein said docking station further includes a release lever pivotally coupled to said framework and that is displaced from said deployment latch and that includes first and second ends, said release latch being operable to rotate from a normally retracted configuration to a deployed configuration when said motor casing rod is fully inserted into said docking receiver channel during a docking process such that said second end of said release lever urges said stop member to said retracted configuration for releasing said motor casing rod from said filament holder.

3. The docking assembly as in claim 2, wherein said docking station further includes a floating actuator situated in said docking receiver channel and is movable between a docking configuration adjacent said first end of said docking latch and a releasing configuration atop said release lever.

4. The docking assembly as in claim 3, wherein said floating actuator is a ball having a spherical configuration.

5. The docking assembly as in claim 2, wherein said docking station further includes an actuator ball having a spherical configuration positioned in said docking receiver channel and is movable between a) a docking configuration adjacent said first end of said docking latch associated with a docking event operable for coupling said motor casing rod to said filament housing upon insertion of said motor casing rod into said docking receiving channel which causes said actuator ball to actuate said deployment latch and b) a releasing configuration positioned atop said release lever and operable for releasing said motor casing rod from said filament holder upon insertion of said motor casing rod into said docking receiving channel which causes said actuator ball to actuate said release lever.

6. The docking assembly as in claim 5, wherein:
said release lever includes a top surface defining a recessed area configured to receive said actuator ball at said releasing configuration;
said actuator ball is positioned in said recessed area at said releasing configuration so as to be impacted by a filament holder rod of the filament holder when said motor casing rod is inserted into said docking receiving channel during said docking process.

7. The docking assembly as in claim 2, wherein:
said deployment latch has an arcuate configuration and is pivotally coupled to said framework, said deployment latch being operable to rotate from said retracted configuration in which said deployment latch is unrotated to said deployed configuration in which said deployment latch is rotated when said motor casing rod is fully inserted into said docking receiver channel during a retrieval process so that said second end of said deployment latch urges said stop member to said deployed configuration for coupling together said motor casing rod and said filament holder;
said release lever has an arcuate configuration pivotally coupled to said framework and that is displaced from said deployment latch and that includes first and second ends, said release latch being operable to move from said retracted configuration in which said lever member is unrotated to said deployed configuration in which said lever member is rotated when said motor casing rod is fully inserted into said docking receiver channel during a docking process such that said second end of said release lever urges said stop member to said retracted configuration for releasing said motor casing rod from said filament holder.

8. The docking assembly as in claim 7, wherein:
said deployment latch is normally biased toward said unrotated configuration by a first compression spring;
said release lever is normally biased toward said unrotated configuration by a second compression spring; and
said stop member is normally biased toward said deployed configuration by a third compression spring.

9. The docking assembly as in claim 8, wherein:
said first compression spring is compressed when said deployment latch is rotated toward said rotated configuration;
said second compression spring is compressed when said release lever is rotated toward said rotated configuration;
said third compression spring is extended when said deployment latch is rotated toward said rotated configuration.

10. The docking assembly as in claim 1, wherein:
said filament holder is a plurality of filament holders, each filament holder defining a respective filament receiver channel and operable for selectively receiving said motor casing rod;
wherein said each filament holder includes a respective stop member that is movable between a retracted position displaced from said recess of said motor casing rod and a deployed configuration engaged with said recess of said motor casing rod when said motor casing rod is fully extended through said respective filament receiver channel during a retrieval process;
said docking station is a plurality of docking stations, each docking station, comprising:
a respective docking wall defining a respective docking receiver channel that is collinear and in communication with said respective filament receiver channel and operable for receiving said motor casing rod;
a framework extending away from said docking wall;
a respective deployment latch coupled to said framework and includes first and second ends, said deployment latch being operable to move from a normally retracted configuration to a deployed configuration when said motor casing rod is fully inserted into said docking receiver channel during a retrieval process so that said second end of said deployment latch urges said stop member to move to said deployed configuration for coupling together said motor casing rod and said filament holder.

\* \* \* \* \*